United States Patent
Kamikawa et al.

(10) Patent No.: US 6,932,612 B2
(45) Date of Patent: Aug. 23, 2005

(54) SYSTEM AND METHOD FOR LEARNING SUPPORT USING KEYWORDS

(75) Inventors: Shunichi Kamikawa, Kawasaki (JP); Hiroshi Kuzumaki, Ota (JP); Keiko Chida, Ota (JP); Ryusuke Momose, Ota (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/259,508

(22) Filed: Sep. 30, 2002

(65) Prior Publication Data

US 2003/0186209 A1 Oct. 2, 2003

(30) Foreign Application Priority Data

Mar. 26, 2002 (JP) .................................... 2002-085064

(51) Int. Cl.⁷ ............................................... G09B 7/00
(52) U.S. Cl. ...................... 434/322; 434/323; 434/350; 434/362
(58) Field of Search ............................... 434/322, 323, 434/350, 362

(56) References Cited

U.S. PATENT DOCUMENTS

| | | | | |
|---|---|---|---|---|
| 5,437,553 A | * | 8/1995 | Collins et al. | 434/322 |
| 5,820,386 A | * | 10/1998 | Sheppard, II | 434/322 |
| 6,302,698 B1 | * | 10/2001 | Ziv-El | 434/323 |
| 6,461,166 B1 | * | 10/2002 | Berman | 434/323 |
| 2003/0049592 A1 | * | 3/2003 | Park | 434/322 |

* cited by examiner

*Primary Examiner*—Chanda L. Harris
(74) *Attorney, Agent, or Firm*—Staas & Halsey LLP (57) ABSTRACT

Learning materials each of which consists of learning material units are stored in a learning material DB. Keywords corresponding to the respective learning materials are stored in the learning material evaluating table. A keyword-unit table defines which learning material units include the respective keywords. A learner clicks an Understood button when the learner understand the current unit. After the learner finishes to attend the current learning material, the keywords corresponding to the units in which the Understood button was clicked are specified based on the keyword-unit table. A learning material whose keywords are in the best agreement with the keywords specified is selected as a learning material to improve ability of the learner in the strong field based on the learning material evaluating table. In the same manner, a learning material to supplement the weak field is selected based on a history of clicks of a Not Understood button.

10 Claims, 9 Drawing Sheets

FIG. 2

<LEARNING MATERIAL DB 11>

| Learning Material Number | Learning Material Name | Unit Number | Unit Entity |
|---|---|---|---|
| 3742 | OSI Reference Model | 1 | OSI reference model is one of network standards. Regulation on a network is classified into seven layers such as a physical layer, a data link layer, a network layer, .... |

FIG. 3

<LEARNING MATERIAL EVALUATING TABLE 12>

| Learning Material Number | Learning Material Name | Available Knowledge | Development Keyword | Supplement Keyword |
|---|---|---|---|---|
| 3501 | Basic of Network | | ..... | LAN, WAN, Server, ... |
| 3742 | OSI Reference Model | | Network Architecture, IEEE802, ... | ISO Standard, ITU, Connection of LAN, ... |
| 3781 | TCP/IP | | LAN, Network Standard, Network Layer, ... | CSMA/CD, Addressing, ... |
| 3896 | Routing | | IP Address, Gateway, ... | |
| 3898 | Fire Wall | | ..... | ..... |

FIG. 4

<KEYWORD-UNIT TABLE 13>

| Number | Keyword | Appearance Number | Unit 1 | Unit 2 | Unit 3 | ... | Unit i | ... | Unit m |
|---|---|---|---|---|---|---|---|---|---|
| 1 | LAN | 1 | O | | | | | | |
| 2 | Network Standard | 2 | O | | | | O | | |
| 3 | Data Communications Equipment | 1 | | | O | | | | |
| ... | | | | | | | | | |
| j | OSI Reference Model | 4 | O | O | | | O | | O |
| ... | | | | | | | | | |
| n | Network Layer | 2 | | | | | O | | O |

FIG. 5

<LEARNER DB 14>

| Learner Number | Learner Name | Learning Material Number | Lecture Identifying number (Learner number-Learning material number-Suffix) |
|---|---|---|---|
| 01-00367254 | Ii Learning | 3742 | 01-00367254-3742-00 |
| ... | | | |

FIG. 6

<LEARNING MANAGEMENT DB 15>

| Lecture Identifying Number | Start Date | Deadline | End Date | Final Test Result |
|---|---|---|---|---|
| 01-00367254-3742-00 | 2001.12.01 | 2002.02.28 | | |
| ... | | | | |

FIG. 7

<LEARNING HISTORY DB 16>

| Lecture Identifying Number | Event Serial Number | Event ID | Event | Date and Time of Event | Learning Material Unit Number |
|---|---|---|---|---|---|
| 01-00367254-3742-00 | 13 | 110 | "Understood" button was clicked | 2001.12.05 13:43:08 | 1 |
| ... | | | | | |
| 01-00367254-3742-00 | 21 | 130 | "Not Understood" button was clicked | 2001.12.05 14:10:17 | 3 |
| 01-00367254-3742-00 | 23 | 120 | "Next" button was clicked | 2001.12.05 14:15:21 | 4 |
| ... | | | | | |

FIG. 8

Learning Course [3742 OSI Reference Model Item i]

OSI reference model is one of network standards. Regulation on a network is classifyed into seven layers such as a physical layer, a data link layer, a network layer, ---

| Understood | Next | Not Understood |

FIG. 11

<BUTTON CLICKED UNIT TABLE T1>

| | Number of "Understood" Unit | Number of "Not Understood" Unit |
|---|---|---|
| Button Clicked Unit | 4 | 1 |

| | Unit 1 | Unit 2 | Unit 3 | ... | Unit i | ... | Unit m |
|---|---|---|---|---|---|---|---|
| | ⊕ | ⊕ | ⊗ | | ⊕ | | ⊕ |

FIG. 12

<APPEARANCE NUMBER TABLE T2>

| Number | Keyword | "Understood" Appearance Number | "Not Understood" Appearance Number |
|---|---|---|---|
| 1 | LAN | 1 | |
| 2 | Network Standard | 2 | |
| 3 | Data Communications Equipment | 1 | |
| ... | ... | ... | ... |
| i | OSI Reference Model | 4 | 1 |
| ... | ... | ... | ... |
| n | Network Layer | 2 | |

FIG. 13

<STRONG FIELD TABLE T3>

| LAN | Network Standard | OSI Reference Model | Network Layer |
|---|---|---|---|

FIG. 14

<WEAK FIELD TABLE T4>

| Data Communications Equipment |
|---|

FIG. 15

We judged that you are strong in the field of this learning material. In order to improve your ability in this field, we recommend you to attend the following learning material.
Click the name to sign up for the learning material.

| Number | Name |
|---|---|
| 3781 | [TCP/IP] |

[Back]  [Go to sign up page for learning material]

SYSTEM AND METHOD FOR LEARNING SUPPORT USING KEYWORDS

BACKGROUND OF THE INVENTION

1. Field of the Invention

The present invention relates to a learning support method and a learning support program in so-called "e-Learning" system.

2. Prior Art

In late years the learning support system with a network and the World Wide Web technology has been developed. A learner (a student) is able to attend a lecture opened on the Web through a Web browser. Accordingly, a learner can study in a desired time at a desired place without limitations of time and place.

However, unlike a classroom education in which a plurality of learners gather in a classroom to attend a lecture, it is impossible to detect and analyze intelligibility of each learner and to recommend each learner to attend a next learning course (learning material) that should be attended by the learner according to the analyzed result in conventional learning support systems.

In the classroom education, an instructor can infer what points were understood and what points were not understood by respective learners from their facial expressions, behavior and an atmosphere of the classroom. Therefore, the instructor can recommend each learner to attend a learning material that is effective to develop his or her strong field or to supplement his or her weak field by analyzing degree of intelligibility of the learners after finishing a lecture of a learning material.

On the other hand, since conventional learning support systems cannot realize a strong field and/or a weak field of each learner, it is difficult to give each learner effective advice about a next learning material to attend.

SUMMARY OF THE INVENTION

It is therefore an object of the present invention to provide an improved learning support method, which is capable of selecting a learning material that should be attended by a learner.

A learning support method according to the present invention is executed with a server computer that includes a storage in which a plurality of learning materials each of which consists of a plurality of learning material units, learning material evaluating information including keywords linked with the respective learning materials and keyword-unit information indicating which learning material units include the respective keywords in each of the learning materials are installed. The server computer is able to connect with a client computer of a learner. The method includes a transmitting step for transmitting a learning material unit to the client computer, a receiving step for receiving response information that indicates intelligibility of the learner who attends the learning material unit transmitted at the learning material transmitting step, a storing step for storing history information that consists of a combination of the learning material unit and the response information with respect to the current learning material unit, a unit specifying step for specifying the learning material units that were finished with a predetermined intelligibility in the current learning material based on the history information after the learner finishes to attend the current learning material, a keyword specifying step for specifying the keywords corresponding to the learning material units specified at the unit specifying step based on the keyword-unit information, and a selecting step for selecting a learning material whose keywords are in the best agreement with the keywords specified at the keyword specifying step based on the learning material evaluating information.

With this method, since a next learning material can be determined based on learner's strong/weak fields, the learner is able to improve his or her ability in the strong field or to supplement his or her ability in the weak field effectively.

The server computer may be a single computer machine or a distributed computer system that consists of a network of a plurality of computer machines.

The unit specifying step may specify the learning material units that were finished with sufficient understanding and/or the learning material units that were finished without sufficient understanding in the current learning material.

The keywords in the learning material evaluating information may be divided into development keywords and supplement keywords. In such a case, the unit specifying step specifies first-type units that has finished with sufficient understanding and second-type units that has finished without sufficient understanding, and the selecting step selects one of a learning material whose development keywords are in the best agreement with the keywords corresponding to the first-type units and a learning material whose supplement keywords are in the best agreement with the keywords corresponding to the second-type units.

The selecting step may select a learning material whose development keywords are in the best agreement with the keywords corresponding to the first-type units when a ratio of a number of the first-type units to a number of the second-type units is larger than a predetermined value, otherwise the selecting step may select a learning material whose supplement keywords are in the best agreement with the keywords corresponding to the second-type units.

The above described method is also available as a computer program executed on the server computer or the system consisting of the server computer and the program thereof.

DESCRIPTION OF THE PREFERRED EMBODIMENTS

Figure 1:
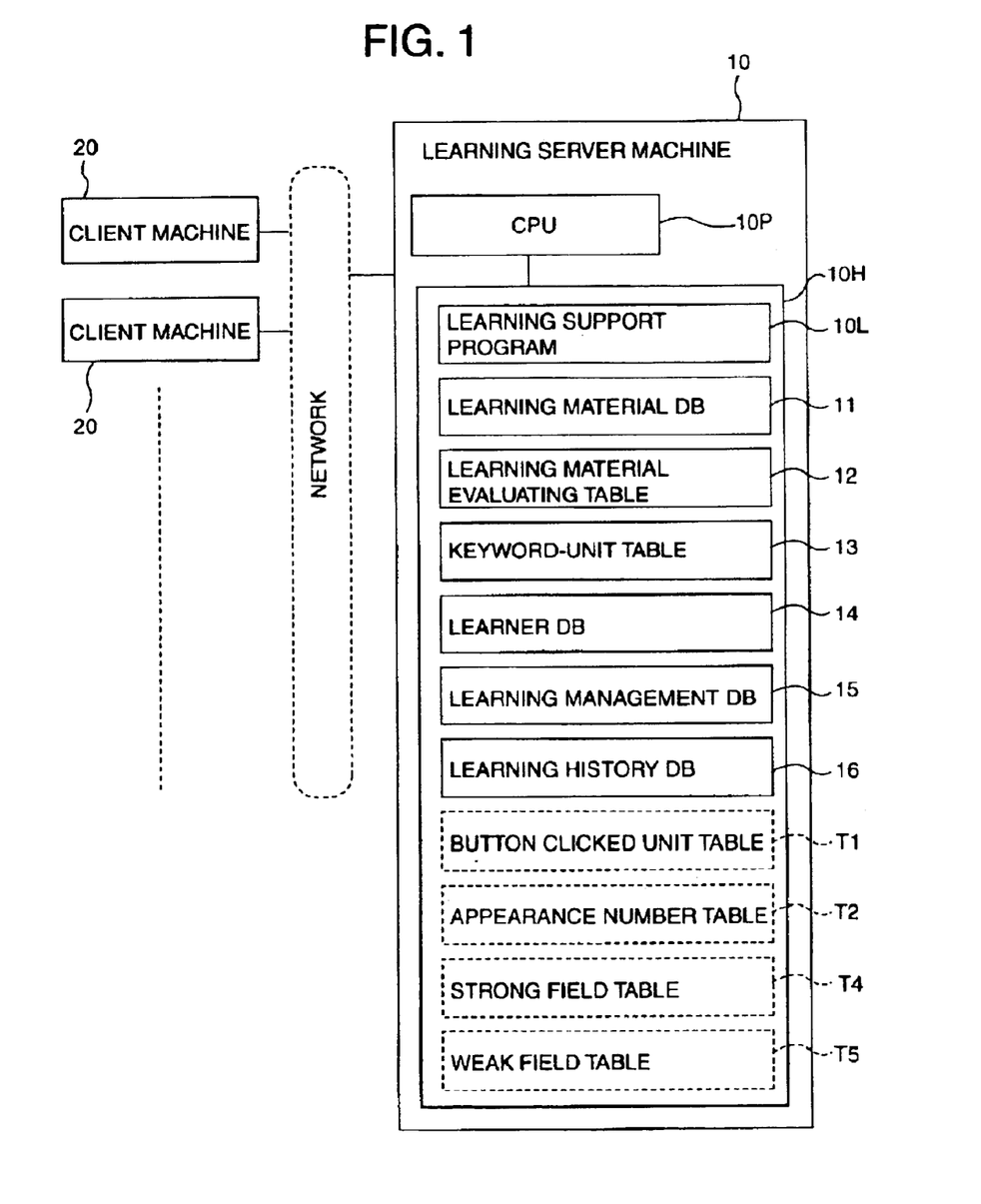
FIG. 1 is a block diagram showing the entire system of a learning support system of an embodiment according to the present invention.

An embodiment of the present invention will be described with reference to the drawings. FIG. 1 is a block diagram of the entire system including a learning server machine 10 of the embodiment. The learning server machine 10 is a server computer located in an e-learning center and it can connect to a plurality of client machines 20 through a network such as the Internet. Further the learning server machine 10 is provided with a CPU 10P and a memory portion (storage) 10H having a hard disk and a memory that are connected to the CPU 10P. A learning support program 10L is installed in the memory portion 10H. The learning support program 10L includes a Web server program module, a server side program module and other program modules to execute processes described below with reference to FIGS. 9 and 10.

For example, the client machine 20 consists of a personal computer in which a Web browser program is installed. A learner can attend a lecture supplied by the learning server machine 10 by accessing to the learning server machine 10 from the client machine 20.

A learning material supplied by the learning server machine 10 consists of a plurality of learning material units. The contents of a learning material are arranged in a hierarchical format consisting of nodes of "chapter", "paragraph", "section" and "item". The learning material unit includes contents corresponding to the item. A learner who attends a lecture obtains a learning material corresponding to the lecture by the learning material unit in sequence to progress his or her learning. The learning materials are managed by the learning material DB 11 in the memory portion 10H of the learning server machine 10.

Figure 2:
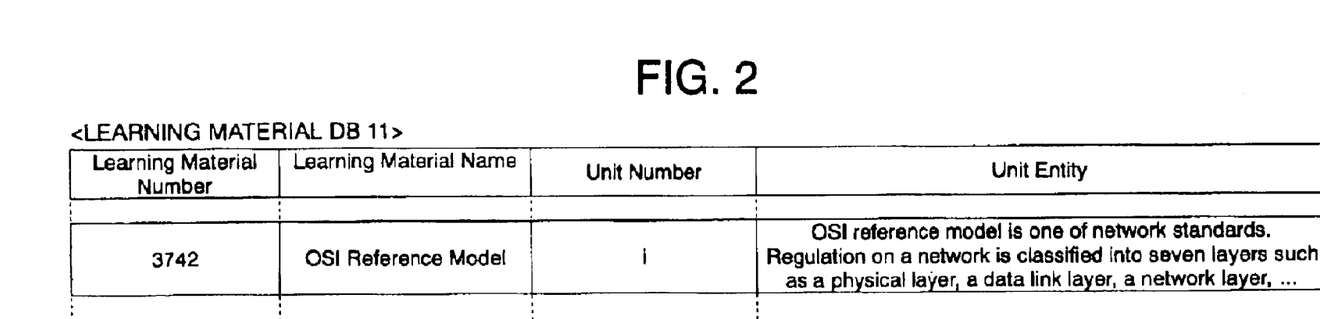
FIG. 2 is a table showing a data layout of a learning material DB.

FIG. 2 shows a data layout of learning material DB 11. The learning material DB 11 contains a plurality of records that are created for respective learning material units, and each record includes fields of "Learning Material Number", "Learning Material Name", "Unit Number" and "Unit Entity".

A learning material number, which is uniquely given for a learning material, is stored in the "Learning Material Number" field. A learning material name is stored in the "Learning Material Name" field. A number of the learning material unit that is assigned to the unit in the learning material is stored in the "Unit Number" field. The record of the learning material DB 11 can be identified by a combination of the "Learning Material Number" and the "Unit Number". The contents such as image data and text data of the learning material unit corresponding to this record are stored in the "Learning Material Entity" field.

Figure 3:
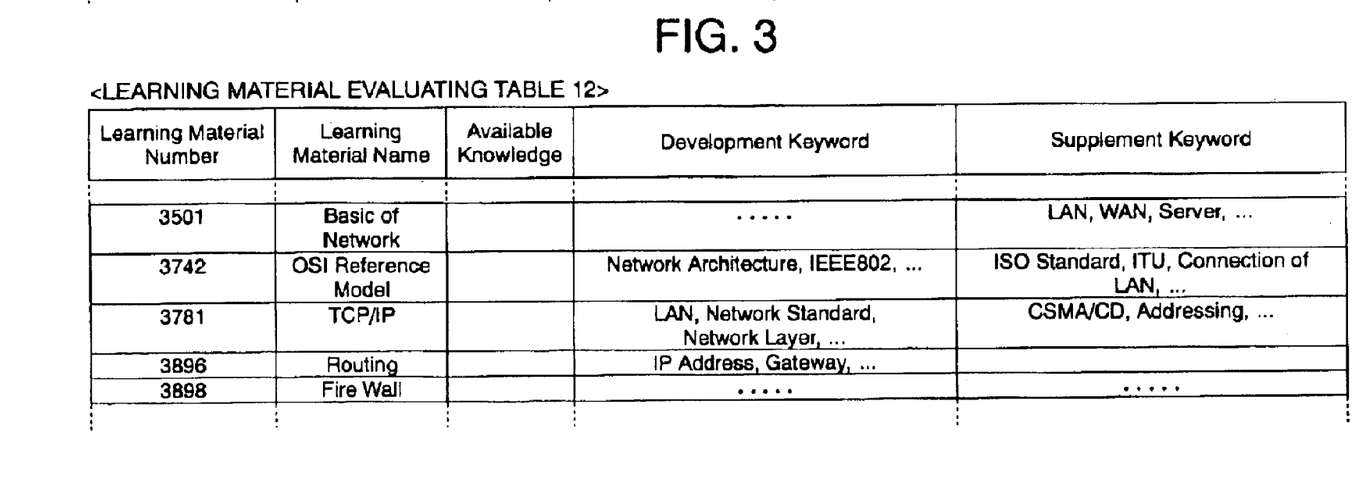
FIG. 3 shows a data layout of a learning material evaluating table.

Further, a learning material evaluating table 12 whose data layout is shown in FIG. 3 is stored in the memory portion 10H. The learning material evaluating table 12 contains a plurality of records that are created for respective learning materials. Each record of the learning material evaluating table 12 includes fields of "Learning Material Number", "Learning Material Name", "Available Knowledge", "Development Keyword" and "Supplement Keyword".

The number of the corresponding learning material and the name of the learning material are stored in the Learning Material Number" and "Learning Material Name" fields, respectively. Information of knowledge that will be obtained by a learner who attends the corresponding learning material is stored in the "Available Knowledge" field.

One or more development keyword that is determined with respect to the corresponding learning material is stored in "Development Keyword" field. The development keyword is determined such that a learner who is strong in the field corresponding to the development keyword can improve his or her ability through attending the learning course (learning material) corresponding to the development keyword.

One or more supplement keyword that is determined with respect to the corresponding learning material is stored in a "Supplement Keyword" field. The supplement keyword is determined such that a learner who is weak in the field corresponding to the supplement keyword can make up for his or her weak points through attending the learning course (learning material) corresponding to the supplement keyword.

Figure 4:
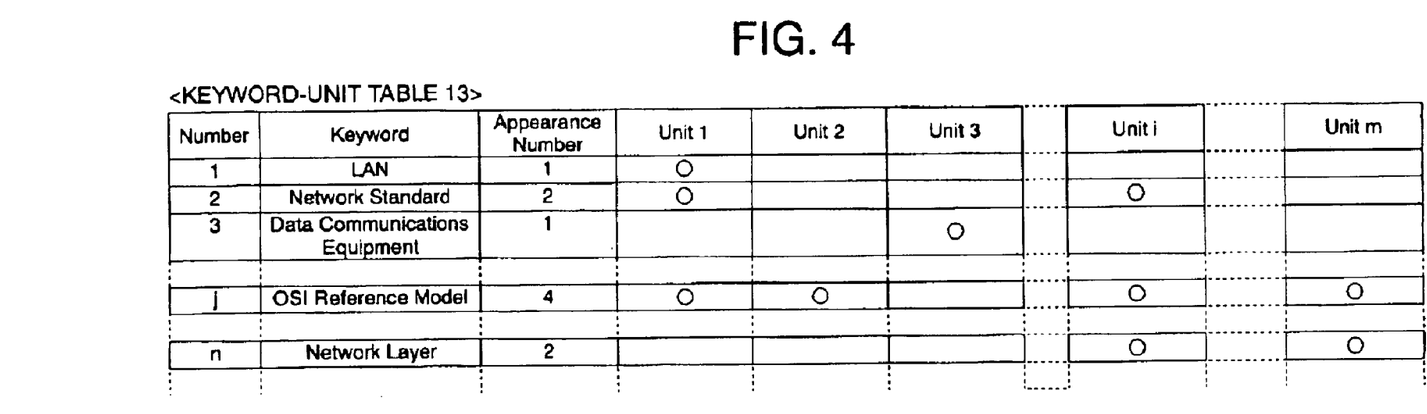
FIG. 4 shows a data layout of a keyword-unit table.

Still further, a keyword-unit table 13 shown in FIG. 4 is stored in the memory portion 10H. The keyword-unit table 13 is created for respective learning materials to indicate which unit of the learning material corresponds to the keyword extracted from the current learning material. In each record corresponding to each keyword in the keyword-unit table 13, the fields of units (Unit 1, Unit 2, Unit 3, . . . , Unit i, . . . , Unit m) are provided and the fields of units including the corresponding keyword are indicated by marks "○". The keyword-unit table 13 in FIG. 4 shows that the keyword "Network Standard" is included in the "Unit 1" and "Unit i", for example. The number of the units including the corresponding keyword is stored in the field of "Appearance Number". For instance, in FIG. 4, since the "Network Standard" is included in two units, the appearance number is "2".

Figure 5:
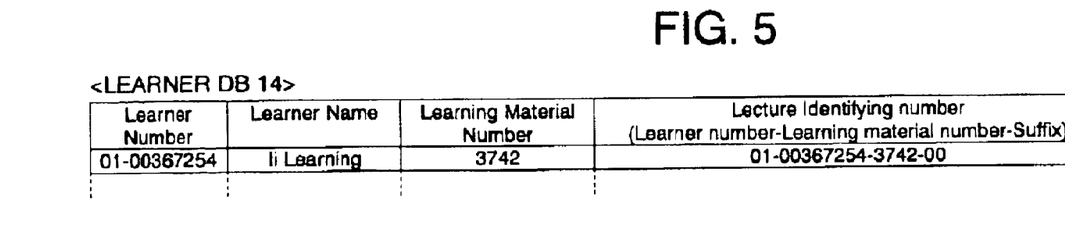
FIG. 5 is a table showing a data layout of a learner DB.

Yet further, a learner DB 14 shown in FIG. 5 is stored in the memory portion 10H. The learner DB 14 contains a plurality of records, and each record includes fields of "Learner Number", "Learner Name", "Learning Material Number" and "Lecture Identifying Number". A learner number that is uniquely given for a learner is stored in the "Learner Number" field. A learner name is stored in the "Learner Name" field. The number of the learning material of the learning material attended by the learner is stored in the "Learning Material Number" field. The lecture identifying number that is formed of the learner number, the learning material number and a suffix is stored in the "Lecture Identifying Number" field. The learner number and the learning material number are extracted from the lecture identifying number adversely. Namely, the learner and the learning material can be specified based on the lecture identifying number. Each record of the learner DB 14 uniquely corresponds to the lecture identifying number.

Figure 6:
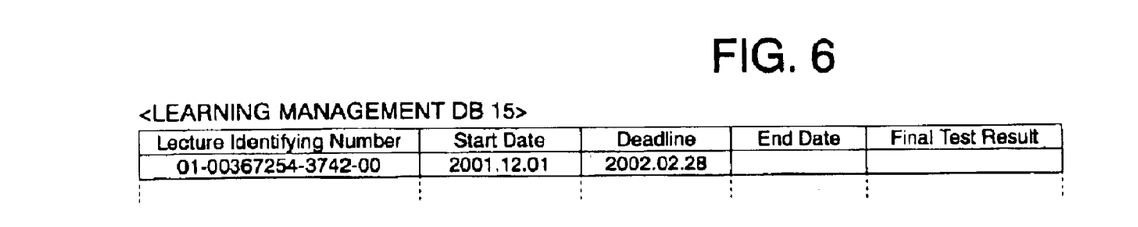
FIG. 6 is a table showing a data layout of a learning management DB.

Further, a learning management DB 15 shown in FIG. 6 is stored in the memory portion 10H. The learning management DB 15 contains a plurality of records that are created for the respective lecture identifying numbers, and each record includes fields of "Lecture Identifying Number", "Start Date", "Deadline", "End Date" and "Final Test Result".

A date when the learner identified by the lecture identifying number started to attend the lecture with the learning course (learning material) of the corresponding learning material number is stored in the "Start Date" field. A deadline date set to the learning material is stored in the "Deadline" field. A default of the "End Date" is NULL. When the learner finishes the learning material, the finish date is stored in the "End Date" field. A default of the "Final Test Result" is NULL. When the learner takes a final test, a test result is stored in the "Final Test Result" field.

Figure 7:
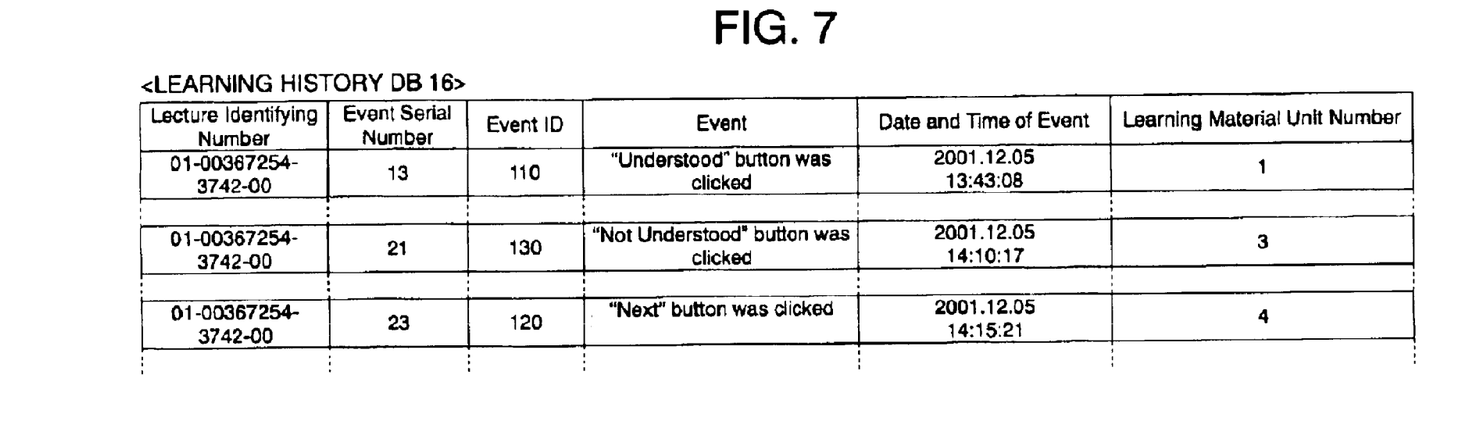
FIG. 7 is a table showing a data layout of a learning history DB.

Furthermore, a learning history DB 16 shown in FIG. 7 is stored in the memory portion 10H. The learning history DB 16 is a database to store a history of events detected during learning. Click of a button displayed on a Web page by a learner generates an event. When an event occurs during one learner is learning one learning material, the learning server machine 10 assigns a sequential event number to the event generated and creates a new record in the learning history DB 16 to store the content of the event with the sequential event number. Records created for all events by all learner are stored in the learning history DB 16. Each record is uniquely distinguished according to the lecture identifying number, which shows the learner number and the learning material number, and the sequential event number.

Figure 8:
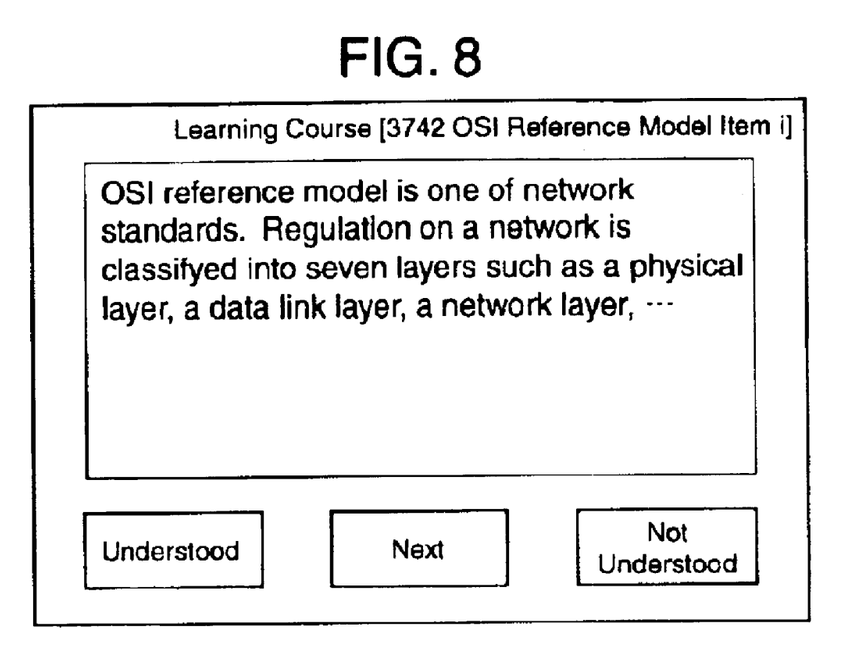
FIG. 8 shows a Web page displaying a learning material.

As shown in FIG. 8, three buttons are displayed on the learning Web page corresponding to one learning material unit. There are "Understood", "Next" and "Not Understood" buttons on the Web page.

A learner who understood the contents of the learning material unit (the learning material entity) clicks the "Understood" button on this Web page. On the other hand, a learner who could not understand the contents clicks the "Not Understood" button. When a learner would like to skip the current learning material unit without sending the information about his or her intelligibility, the learner clicks the "Next" button.

As described above, the history of clicks is accumulated in the learning history DB 16 as a record corresponding to a combination of the lecture identifying number and the sequential event number. As shown in FIG. 7, each record of the learning history DB 16 includes fields of "Event ID", "Event", "Date and Time of Event" and "Learning Material Unit Number" in addition to the fields of "Lecture Identifying Number" and "Sequential Event Number".

An ID number corresponding to a type of the event and information showing the contents of the event occurred are stored in the "Event ID" and "Event" fields, respectively. Date and time when the event occurred are stored in the "Date and Time of Event" field. The number of the learning material unit that was learned by the learner at the time of the occurrence of the event is stored in the "Learning Material Unit Number" field.

A process when a learner attends a learning material will be described with reference to the flowchart of FIG. 9. In the process shown by the flowchart of FIG. 9, a variable "i" is allocated in the memory portion 10H of the learning server machine 10 and a variable "j" is allocated in a memory (not shown) of the client machine 20.

At first, a learner operates the client machine 20 to notify the learning server machine 10 that he or she starts to attend one learning material (S101). Then the learning server machine 10 accepts his or her attending the learning material (S201). The learning server machine 10 substitutes "1" for the variable "i" (S202). Then the learning server machine 10 creates a Web data including the unit entity of the Unit 1 corresponding to the variable "i" (i=1) and transmits it to the client machine 20 (S203).

On the other hand, the client machine 20 substitutes "1" for the variable "j" (S102). The client machine 20 further receives the Web data of the Unit 1 transmitted at step S202 and displays it as the Web page (S103). The learner studies the unit entity with the Web page displayed at S103 (S104). When the learner finishes the learning, he or she clicks one of the "Understood" button, the "Next" button and the "Not Understood" button in accordance with his or her intelligibility.

The client machine 20 detects the event generated by the click of one of these buttons and transmits information representing the event (response information) to the learning server machine 10 (S105). The event generated by the click of the "Understood" button represents that the learner could understand the current learning material unit. Further, the event generated by the click of the "Not Understood" button represents that the learner could not understand the current learning material unit.

The learning server machine 10 receives the response information transmitted at S105 (S204) and creates a record including the event indicated by the response information (button click history) to add it to the learning history DB 16 as history information (S205). Then the learning server machine 10 increments the variable "i" by 1 (S206). When the Unit i corresponding to the variable "i" exists, the learning server machine 10 creates a Web data including the unit entity of the Unit i (S207). When the Unit i does not exist, the learning server machine 10 creates a Web data indicating the end of the learning material and transmits it to the client machine 20.

The client machine 20 increments the variable "j" by 1 (S106) and receives the Web data transmitted at S207 to display the unit entity of the Unit j as a Web page (S107). When the Web data displayed at S107 does not indicate the end of the learning material (S108, No), the client machine 20 sends information to continue the learning to the learning server machine 10 (S109) and turns back the process to S104 such that the learner can continue the learning. On the other hand, when the Web data displayed at S107 indicates the end of the learning material (S108, Yes), the client machine 20 sends information to finish the learning to the learning server machine 10 (S110) and goes on with the process to S111.

The learning server machine 10 receives the information sent by the client machine 20 at S109 or S110 (S208). When the information does not indicate the finish of the learning (S209, No), the learning server machine 10 turns back the process to S204. When the information indicates the finish of the learning (S209, Yes), the learning server machine 10 executes a learning end process (S210). For instance, the current date is stored in the "End Date" field of the corresponding record in the learning management DB 15 during the learning end process. Then the learning server machine 10 executes a process to select a next learning material that should be attended by the learner (S211).

Hereinafter, the process in S211 of FIG. 9 will be described in detail with reference to FIG. 10. In the process of FIG. 10, a constant a that is stored in the memory portion 10H and a variable r that is allocated in the memory portion 10H will be used. The value of the constant $\alpha$ is predetermined ($\alpha$=2, for example).

Figure 11:
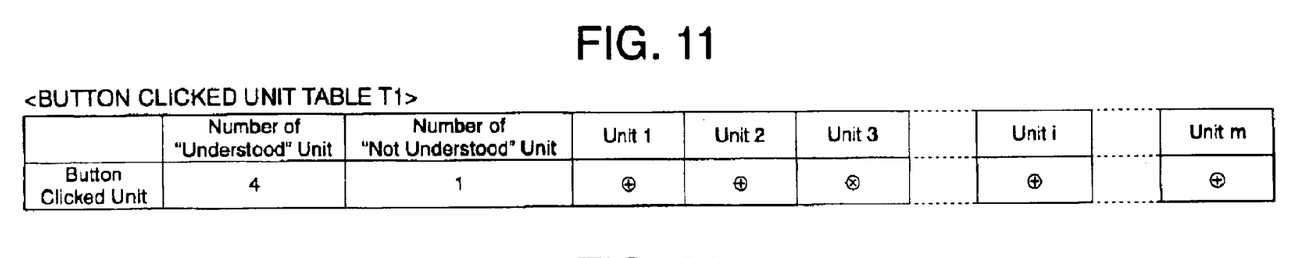
FIG. 11 shows a data layout of a button-clicked-unit table.

The learning server machine 10 refers to the learning history DB 16 (FIG. 7) to create a button-clicked-unit table T1 shown in FIG. 11 according to the information of the records identified by a combination of the current learner and the learning material attended by the current learner in the learning history DB 16 (S301). In the button-clicked-unit table T1, a unit in which the "Understood" button was clicked (a first-type unit) is marked by "⊕" and a unit in which the "Not Understood" button was clicked (a second-type unit) is marked by "ⓧ". A number of units in which the "Understood" button was clicked (number of "⊕") is counted as a number of "Understood" units. A number of units in which the "Not Understood" button was clicked (number of "ⓧ") is counted as a number of "Not Understood" units.

Figure 12:
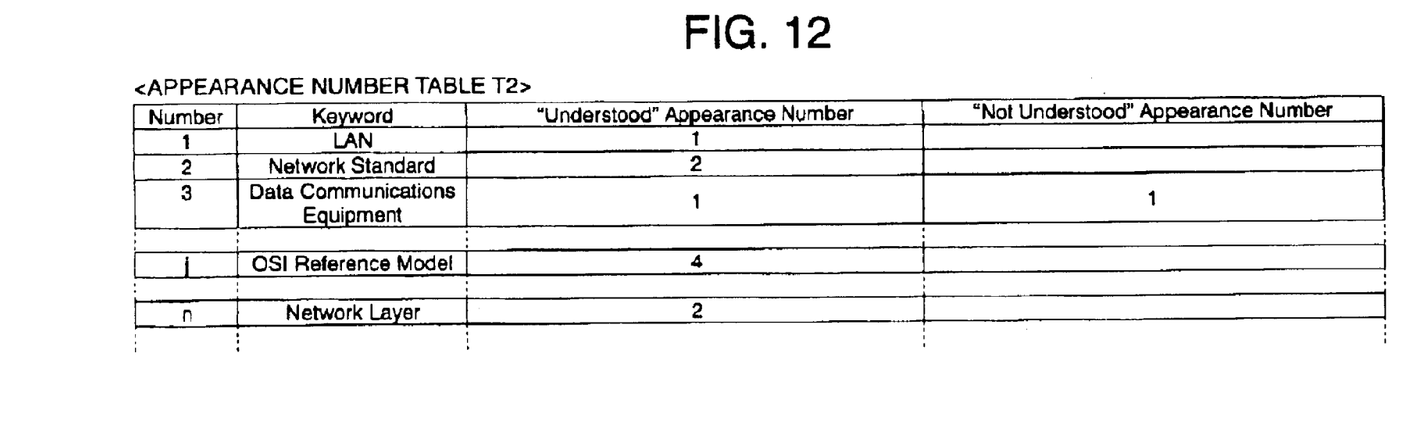
FIG. 12 shows a data layout of an appearance number table.

Next, the learning server machine 10 creates an appearance number table T2 shown in FIG. 12 based on the keyword-unit table (FIG. 4) and the button-clicked-unit table T1 created at S301 (S302).

A process to create the appearance number table T2 will be further described. The learning server machine 10 refers to the button-clicked-unit table T1 to determine whether the "Understood" button was clicked (whether "⊕" is marked) for each of the Unit 1', Unit 2, ..., Unit i, ..., Unit m. When the "Understood" button was clicked, the learning server machine 10 refers to the keyword-unit table 13 to specify the keywords whose corresponding units are marked with "○". After the learning server machine 10 specified the keywords for all the units in which the "Understood" button was clicked, the learning server machine 10 sets a number of appearances as an "Understood"-appearance-number for every keyword. For example, since the keyword "Network Standard" is related to the Unit 1 and Unit i as shown by the mark "○" in the keyword-unit table 13 (FIG. 4) and the "Understood" button was clicked in both of the Units as shown by the mark "⊕" in the button-clicked-unit table T1 (FIG. 11), the "Understood"-appearance-number of the keyword "Network Standard" becomes "2".

In the same manner, the learning server machine 10 refers to the button-clicked-unit table T1 to determine whether the "Not Understood" button was clicked (whether "ⓧ" is marked) for each of the Unit 1, Unit 2, ..., Unit i, ..., Unit m. When the "Not Understood" button was clicked, the learning server machine 10 refers to the keyword-unit table 13 to specify the keywords whose corresponding units are marked with "○". After the learning server machine 10 specified the keywords for all the units in which the "Not Understood" button was clicked, the learning server machine 10 sets a number of appearances as an "Not Understood"-appearance-number for every keyword. For example, since the keyword "Data Communications Equipment" is related to the Unit 3 as shown by the mark "○" in the keyword-unit table 13 (FIG. 4) and the "Not Understood" button was clicked in the Unit 3 as shown by the mark "ⓧ" in the button-clicked-unit table T1 (FIG. 11), the "Not Understood"-appearance-number of the keyword "Data Communications Equipment" becomes "1".

After the creation of the appearance number table T2 (FIG. 12), the learning server machine 10 refers to the button-clicked-unit table T1 (FIG. 11) to divide the "Understood" unit number by the "Not Understood" unit number and stores the quotient into the variable "r" (S303).

Figure 13:
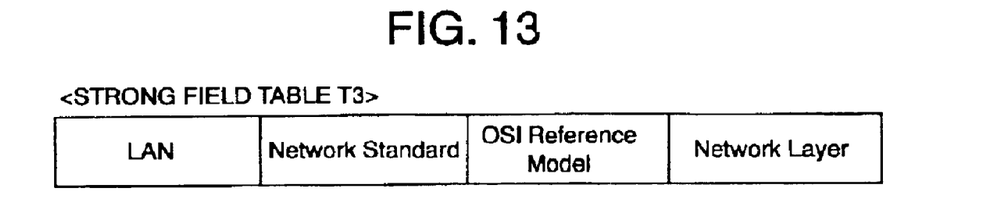
FIG. 13 shows a data layout of a strong field table.

In the case when $r > \alpha$ (S304, Yes), the learning server machine 10 refers to the appearance number table T2 (FIG. 12) to extract the keywords whose "Understood"-appearance-number is equal to or larger than "1" as keywords in a strong field, and creates a strong field table T3 shown in FIG. 13 (S305). In the example shown in FIG. 13, "LAN", "Network Standard", "OSI Reference Model" and "Network Layer" are extracted as the keywords in the strong field.

Next, the learning server machine 10 refers to the learning material evaluating table 12 (FIG. 3) to specify the record whose keywords included in the "Development Keyword" field are in the best agreement with the keywords contained in the strong field table T3 created at S305. If the learning material of the specified record does not yet have attended (which can be confirmed by the learning management DB 15), the learning server machine 10 determines the specified learning material as a recommended learning material for developing the strong field (S306) and finishes the process of FIG. 10.

The keywords are compared based on the number (a number of agreements) of the keywords included in the "Development Keyword" field that are agreement with the keywords contained in the strong field table T3. Namely, the learning material corresponding to the record that has the largest number of agreements is determined as the recommended learning material. If there are a plurality of records that have the largest number of agreements, all the learning materials corresponding to the records are determined as the recommended learning materials. However, the record whose number of keywords in the "Development Keyword" field is smaller has a priority to be recommended.

Figure 14:
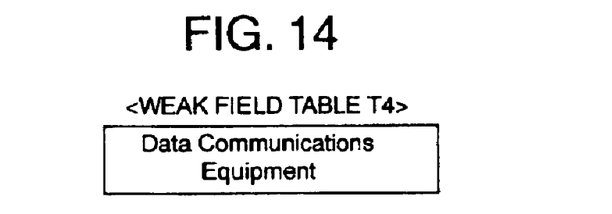
FIG. 14 shows a data layout of a weak field table.

On the other hand, in the case when $r \leq \alpha$ (S304, No), the learning server machine 10 refers to the appearance number table T2 (FIG. 12) to extract the keywords whose "Not Understood"-appearance-number is equal to or larger than "1" as keywords in a weak field, and creates a weak field table T4 shown in FIG. 14 (S307). In the example shown in FIG. 14, "Data Communications Equipment" is extracted as the keyword in the weak field.

Next, the learning server machine 10 refers to the learning material evaluating table 12 (FIG. 3) to specify the record whose keywords included in the "Supplement Keyword" field are in the best agreement with the keywords contained in the weak field table T4 created at S307. If the learning material of the specified record does not yet have attended (which can be confirmed by the learning management DB 15), the learning server machine 10 determines the specified learning material as a recommended learning material for supplementing the weak field (S308) and finishes the process of FIG. 10.

The keywords are compared based on the number (a number of agreements) of the keywords included in the "Supplement Keyword" field that are agreement with the keywords contained in the weak field table T4. Namely, the learning material corresponding to the record that has the largest number of agreements is determined as the recommended learning material. If there are a plurality of records that have the largest number of agreements, all the learning materials corresponding to the records are determined as the recommended learning materials. However, the record whose number of keywords in the "Supplement Keyword" field is smaller has a priority to be recommended.

Figure 9:
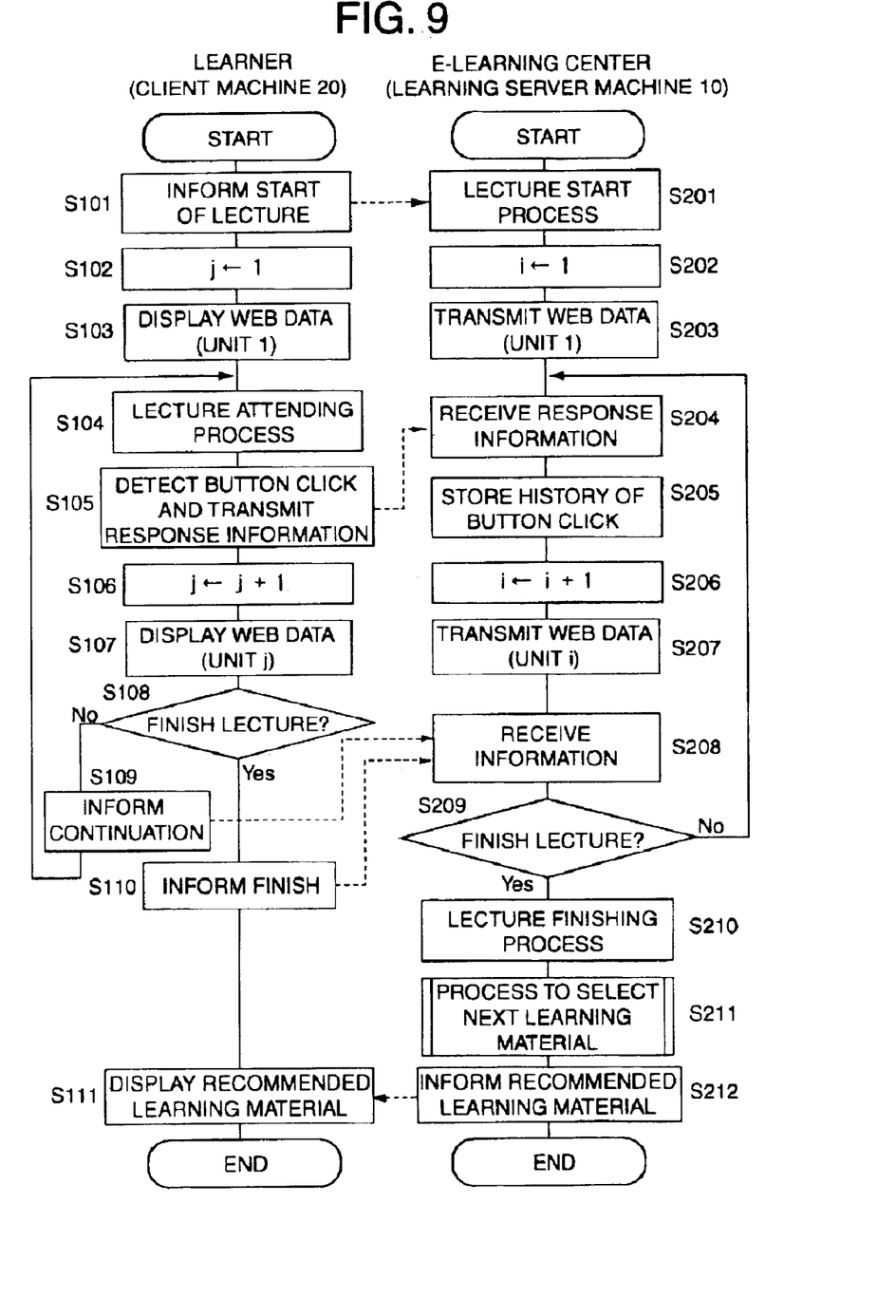
FIG. 9 is a flowchart showing the learning support method of the embodiment.
Figure 10:
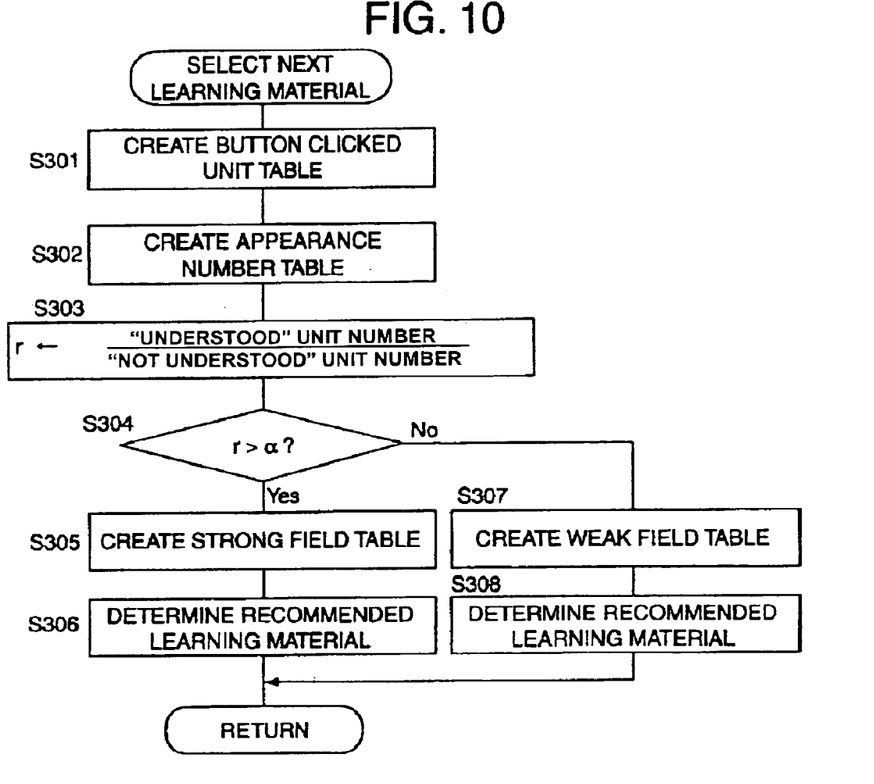
FIG. 10 is a flowchart showing a detailed process of S211 in FIG. 9.
Figure 15:
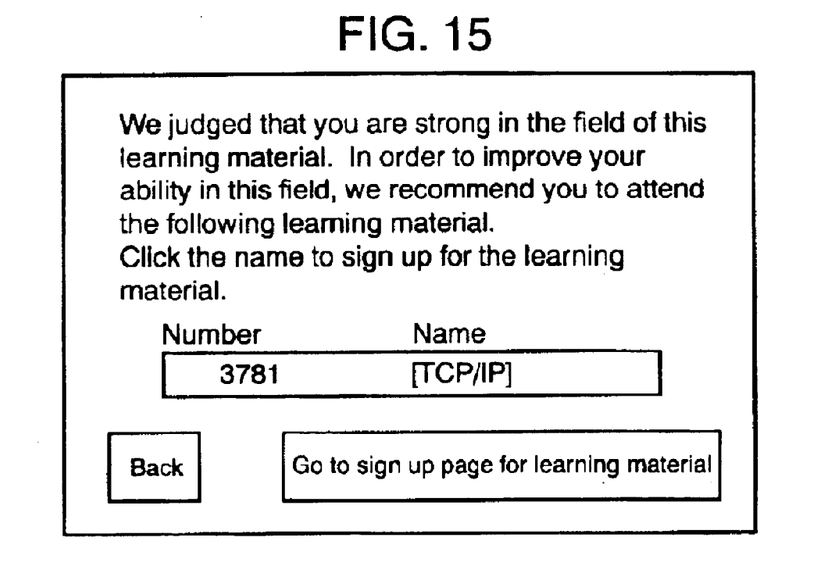
FIG. 15 shows one example of a Web page to recommend a next learning material.

The end of the process in FIG. 10 means the end of the process at S211 in FIG. 9. After that, at S212 in FIG. 9, the learning server machine 10 creates a Web data to recommend the learner to attend the recommended learning material determined at S211 and transmits it to the client machine 20. The client machine 20 receives the Web data transmitted at S212 and displays it as a Web page for recommendation (S111). FIG. 15 shows one example of the Web page for recommendation. In the example of FIG. 15, "TCP/IP" is recommended as a learning material that should be attended to improve the learner's ability in his or her strong field.

As described above, when a learner finishes a learning material with sufficient understanding, a learning material that is effective to improve the ability in his or her strong field is recommended. On the other hand, when a learner finishes a learning material without sufficient understanding, a learning material that is effective to supplement the ability in his or her weak field is recommended. Therefore, a learner can obtain a guiding principle in future learning and can attend the useful learning material for him or her.

According to the present invention described above, since a next learning material can be determined based on learner's strong/weak fields, the learner is able to improve his or her ability in the strong field or to supplement his or her ability in the weak field effectively.

What is claimed is:

1. A learning support method, comprising:

storing a plurality of learning materials each of which comprises a plurality of learning material units;

storing learning material evaluating information including keywords linked with said respective learning materials;

storing keyword-unit information indicating which learning material unit includes said respective keywords in each of said learning materials;

transmitting the learning material units to a client computer;

receiving from a learner, intelligibility declarations by the learner corresponding to each learning material unit, wherein the intelligibility declarations indicate an intelligibility of the learner attending each transmitted learning material unit;

storing history information comprising a combination of said learning material units and said intelligibility declarations by the learner corresponding to the learning material units;

specifying the learning material units that were finished with an intelligibility declaration by the learner, based on said history information after said learner finishes attending the learning material units;

determining learner intelligibility of keywords corresponding to said specified learning material units with the intelligibility declaration by the learner, based on said keyword-unit information of the learning material units; and selecting one of the learning materials whose linked keywords are in a best agreement with the keywords for which learner intelligibility was determined in said determining learner intelligibility of keywords, based on said learning material evaluating information.

2. The learning support method according to claim 1, wherein said specifying of the learning material units specifies the learning material units that were finished by the learner with a sufficient understanding intelligibility declaration, as the intelligibility declaration by the learner of the learning material units.

3. The learning support method according to claim 1, wherein said specifying of the learning material units specifies the learning material units that were finished by the learner without a sufficient understanding intelligibility declaration, as the intelligibility declaration by the learner of the learning material units.

4. The learning support method according to claim 1, wherein said linked keywords in said learning material evaluating information are divided into development keywords and supplement keywords, said specifying of the learning material units specifies first-type learning material units that have been finished with a sufficient understanding intelligibility declaration by the learner, as the intelligibility declaration by the learner of the learning material units, and second-type learning material units that have been finished without a sufficient understanding intelligibility declaration by the learner, as the intelligibility declaration by the learner of the learning material units, and said selecting selects one of the learning materials whose development keywords are in the best agreement with the keywords for which learner intelligibility was determined in said determining learner intelligibility of keywords and corresponding to said first-type finished learning material units and one of the learning materials whose supplement keywords are in the best agreement with the keywords for which learner intelligibility was determined in said determining learner intelligibility of keywords and corresponding to said second-type finished learning material units.

5. The learning support method according to claim 4, wherein said selecting selects one of the learning materials whose development keywords are in the best agreement with the keywords for which learner intelligibility was determined in said determining learner intelligibility of keywords and corresponding to said first-type finished learning material units, when a ratio of a number of said first-type finished learning material units to a number of said second-type finished learning material units is larger than a predetermined value, and when said ratio is not larger, said selecting selects one of the learning materials whose supplement keywords are in the best agreement with the keywords for which learner intelligibility was determined in said determining learner intelligibility of keywords and corresponding to said second-type finished learning material units.

6. A machine-readable data storage storing a learning support program to control a server computer, which is in network communication with a client computer, according to a process comprising:

storing a plurality of learning materials each of which comprises a plurality of learning material units;

storing learning material evaluating information including keywords linked with said respective learning materials; and storing keyword-unit information indicating which learning material unit includes said keywords in each of said learning materials;

transmitting the learning material units to said client computer;

receiving from a learner, intelligibility declarations by the learner corresponding to each learning material unit, wherein the intelligibility declarations indicate an intelligibility of the learner attending each transmitted learning material unit;

storing history information comprising a combination of said learning material units and said intelligibility declarations by the learner corresponding to the learning material units;

specifying the learning material units that were finished with an intelligibility declaration by the learner, based on said history information after said learner finishes attending the learning material units;

determining learner intelligibility of keywords corresponding to said specified learning material units with the intelligibility declaration by the learner, based on said keyword-unit information of the learning material units; and selecting one of the learning materials whose linked keywords are in a best agreement with the keywords for which learner intelligibility was determined in said determining learner intelligibility of keywords, based on said learning material evaluating information.

7. A learning support system comprising:

a server computer in network communication with a client computer and comprising a storage, which stores:
- a plurality of learning materials each of which comprises a plurality of learning material units,
- learning material evaluating information including keywords linked with said respective learning materials,
- keyword-unit information indicating which learning material unit includes said keywords in each of said learning materials, and
- a learning support program to be read by said server computer to control the server computer according to a process comprising:
  - transmitting the learning material units to said client computer;
  - receiving from a learner, intelligibility declarations by the learner corresponding to each learning material unit, wherein the intelligibility declarations indicate an intelligibility of the learner attending each transmitted learning material unit;
  - storing history information comprising a combination of said learning material units and said intelligibility declarations by the learner corresponding to the learning material units;
  - specifying the learning material units that were finished with an intelligibility declaration by the learner, based on said history information after said learner finishes attending the learning material units;
  - determining learner intelligibility of keywords corresponding to said specified learning material units with the intelligibility declaration by the learner, based on said keyword-unit information of the learning material units; and
  - selecting one of the learning materials whose linked keywords are in a best agreement with the keywords for which learner intelligibility was determined in said determining learner intelligibility of keywords, based on said learning material evaluating information.

8. A learning support method, comprising:

storing a plurality of learning materials each of which comprises a plurality of learning material units;

storing learning material evaluating information including keywords, which are divided into development keywords and supplement keywords, linked with said respective learning materials;

storing keyword-unit information indicating which learning material unit includes said respective keywords in each of said learning materials;

transmitting the learning material units to a client computer;

receiving from a learner, intelligibility declarations by the learner corresponding to each learning material unit, wherein the intelligibility declarations indicate an intelligibility of the learner attending each transmitted learning material unit;

storing history information comprising a combination of said learning material units and said intelligibility declarations by the learner corresponding to the learning material units;

specifying the learning material units that were finished with an intelligibility declaration by the learner, based on said history information after said learner finishes attending the learning material units;

determining learner intelligibility of keywords corresponding to said specified learning material units with the intelligibility declaration by the learner, based on said keyword-unit information of the learning material units; and selecting one of the learning materials whose linked keywords are in a best agreement with the keywords for which learner intelligibility was determined in said determining learner intelligibility of keywords, based on said learning material evaluating information, wherein said specifying of the learning material units specifies first-type learning material units that have been finished with a sufficient understanding intelligibility declaration by the learner, as the intelligibility declaration by the learner of the learning material units, and second-type learning material units that have been finished without a sufficient understanding intelligibility declaration by the learner, as the intelligibility declaration by the learner of the learning material units, and wherein said selecting selects one of the learning materials whose development keywords are in the best agreement with the keywords for which learner intelligibility was determined in said determining learner intelligibility of keywords and corresponding to said first-type finished learning material units, when a ratio of a number of said first-type finished learning material units to a number of said second-type finished learning material units is larger than a predetermined value, and when said ratio is not larger, said selecting selects one of the learning materials whose supplement keywords are in the best agreement with the keywords for which learner intelligibility was determined in said determining learner intelligibility of keywords and corresponding to said second-type finished learning material units.

9. A machine-readable data storage storing a learning support program to control a server computer, which is in network communication with a client computer, according to a process comprising:

storing a plurality of learning materials each of which comprises a plurality of learning material units;

storing learning material evaluating information including keywords, which are divided into development keywords and supplement keywords, linked with said respective learning materials;

storing keyword-unit information indicating which learning material unit includes said respective keywords in each of said learning materials;

transmitting the learning material units to the client computer;

receiving from a learner, intelligibility declarations by the learner corresponding to each learning material unit, wherein the intelligibility declarations indicate an intelligibility of the learner attending each transmitted learning material unit;

storing history information comprising a combination of said learning material units and said intelligibility declarations by the learner corresponding to the learning material units;

specifying the learning material units that were finished with an intelligibility declaration by the learner, based on said history information after said learner finishes attending the learning material units;

determining learner intelligibility of keywords corresponding to said specified learning material units with the intelligibility declaration by the learner, based on said keyword-unit information of the learning material units; and selecting one of the learning materials whose linked keywords are in a best agreement with the keywords for which learner intelligibility was determined in said determining learner intelligibility of keywords, based on said learning material evaluating information, wherein said specifying of the learning material units specifies first-type learning material units that have been finished with a sufficient understanding intelligibility declaration by the learner, as the intelligibility declaration by the learner of the learning material units, and second-type learning material units that have been finished without a sufficient understanding intelligibility declaration by the learner, as the intelligibility declaration by the learner of the learning material units, and wherein said selecting selects one of the learning materials whose development keywords are in the best agreement with the keywords for which learner intelligibility was determined in said determining learner intelligibility of keywords and corresponding to said first-type finished learning material units, when a ratio of a number of said first-type finished learning material units to a number of said second-type finished learning material units is larger than a predetermined value, and when said ratio is not larger, said selecting selects one of the learning materials whose supplement keywords are in the best agreement with the keywords for which learner intelligibility was determined in said determining learner intelligibility of keywords and corresponding to said second-type finished learning material units.

10. A learning support system comprising:

a server computer in network communication with a client computer and comprising a storage, which stores:
  a plurality of learning materials each of which comprises a plurality of learning material units,
  learning material evaluating information including keywords, which are divided into development keywords and supplement keywords, linked with said respective learning materials,
  keyword-unit information indicating which learning material unit includes said keywords in each of said learning materials, and
  a learning support program to be read by said server computer to control the server computer according to a process comprising:
    transmitting the learning material units to said client computer;
    receiving from a learner, intelligibility declarations by the learner corresponding to each learning material unit, wherein the intelligibility declarations indicate an intelligibility of the learner attending each transmitted learning material unit;
    storing history information comprising a combination of said learning material units and said intelligibility declarations by the learner corresponding to the learning material units;
    specifying the learning material units that were finished with an intelligibility declaration by the learner, based on said history information after said learner finishes attending the learning material units;
    determining learner intelligibility of keywords corresponding to said specified learning material units with the intelligibility declaration by the learner, based on said keyword-unit information of the learning material units; and
    selecting one of the learning materials whose linked keywords are in a best agreement with the keywords for which learner intelligibility was determined in said determining learner intelligibility of keywords, based on said learning material evaluating information,
      wherein said specifying of the learning material units specifies first-type learning material units that have been finished with a sufficient understanding intelligibility declaration by the learner, as the intelligibility declaration by the learner of the learning material units, and second-type learning material units that have been finished without a sufficient understanding intelligibility declaration by the learner, as the intelligibility declaration by the learner of the learning material units, and
      wherein said selecting selects one of the learning materials whose development keywords are in the best agreement with the keywords for which learner intelligibility was determined in said determining learner intelligibility of keywords and corresponding to said first-type finished learning material units, when a ratio of a number of said first-type finished learning material units to a number of said second-type finished learning material units is larger than a predetermined value, and when said ratio is not larger, said selecting selects one of the learning materials whose supplement keywords are in the best agreement with the keywords for which learner intelligibility was determined in said determining learner intelligibility of keywords and corresponding to said second-type finished learning material units.

* * * * *